(12) United States Patent
Wei (10) Patent No.: US 11,360,307 B2
(45) Date of Patent: Jun. 14, 2022

(54) OPTICAL SYSTEM OF NEAR-EYE SEE-THROUGH HEAD-MOUNTED DISPLAY

(71) Applicant: TAPUYIHAI (SHANGHAI) INTELLIGENT TECHNOLOGY CO., LTD., Shanghai (CN)

(72) Inventor: Rongjie Wei, Shanghai (CN)

( * ) Notice: Subject to any disclaimer, the term of this patent is extended or adjusted under 35 U.S.C. 154(b) by 307 days.

(21) Appl. No.: 16/760,387

(22) PCT Filed: Nov. 7, 2018

(86) PCT No.: PCT/CN2018/114301
§ 371 (c)(1),
(2) Date: Apr. 29, 2020

(87) PCT Pub. No.: WO2019/096038
PCT Pub. Date: May 23, 2019

(65) Prior Publication Data
US 2021/0208399 A1    Jul. 8, 2021

(30) Foreign Application Priority Data

Nov. 14, 2017  (CN) ..................... CN201711124547
Nov. 14, 2017  (CN) ..................... CN201721519012
(Continued)

(51) Int. Cl.
*G02B 27/01* (2006.01)
*G02B 1/04* (2006.01)
(Continued)

(52) U.S. Cl.
CPC ......... *G02B 27/0172* (2013.01); *G02B 1/041* (2013.01); *G02B 3/02* (2013.01); *G02B 25/001* (2013.01); *G02B 2003/0093* (2013.01)

(58) Field of Classification Search
CPC .................. G02B 1/041; G02B 25/001; G02B 2003/0093; G02B 3/02; G02B 3/10; G02B 27/0172; G02B 27/017; G02B 27/01
(Continued)

(56) References Cited

U.S. PATENT DOCUMENTS 9,529,196 B1 * 12/2016 Sade ..................... G02B 17/086
2013/0187836 A1 * 7/2013 Cheng ...................... G02B 5/04
345/8
(Continued)

FOREIGN PATENT DOCUMENTS

| CN | 101900872 | 12/2010 |
| CN | 102566044 | 7/2017 |
| CN | 106997066 | 8/2017 |

*Primary Examiner* — William R Alexander
(74) *Attorney, Agent, or Firm* — Clement Cheng (57) ABSTRACT

The invention discloses an optical system of near-eye see-through head-mounted display, comprising a first lens, a second lens and a micro image display, the first lens and the second lens are attached to the micro image display, and the first lens and the second lens are free-form lenses with a uniform thickness. The architecture of the optical system of near-eye see-through head-mounted display provided by the present invention can not only reduce the number of times the light is refracted in the architecture of the optical system, but also eliminate the aberration of the light emitted by the micro image display in all directions, making the images be viewed from all directions and angles with no aberration.

21 Claims, 6 Drawing Sheets

(30) Foreign Application Priority Data

Jan. 18, 2018 (CN) .................. CN201810050821
Jan. 18, 2018 (CN) .................. CN201820087744

(51) Int. Cl.
*G02B 3/02* (2006.01)
*G02B 25/00* (2006.01)
*G02B 3/00* (2006.01)

(58) Field of Classification Search
USPC ........................................... 359/630
See application file for complete search history.

(56) References Cited

U.S. PATENT DOCUMENTS

| | | | | |
|---|---|---|---|---|
| 2014/0071539 A1* | 3/2014 | Gao | ............... | G02B 27/0025 359/737 |
| 2014/0361957 A1* | 12/2014 | Hua | ............... | G02B 27/0093 345/8 |
| 2014/0375789 A1* | 12/2014 | Lou | ............... | G02B 27/0172 348/78 |
| 2016/0085075 A1* | 3/2016 | Cheng | ............... | G02B 27/0172 359/631 |
| 2016/0109652 A1* | 4/2016 | Schowengerdt | ...... | G02F 1/1334 385/24 |
| 2016/0299344 A1* | 10/2016 | Dobschal | ............... | G02C 7/086 |
| 2017/0276918 A1* | 9/2017 | Hua | ............... | G02B 17/08 |
| 2018/0045949 A1* | 2/2018 | Hua | ............... | G02B 27/0172 |
| 2018/0045964 A1* | 2/2018 | Jones | ............... | G02B 27/0172 |
| 2018/0095281 A1* | 4/2018 | Takeda | ............... | G02B 27/0172 |
| 2018/0164599 A1* | 6/2018 | Hu | ............... | G02B 27/0093 |
| 2018/0373038 A1* | 12/2018 | Ishii | ............... | G03B 21/14 |
| 2019/0227287 A1* | 7/2019 | Cheng | ............... | G02B 17/08 |
| 2019/0260982 A1* | 8/2019 | Hua | ............... | H04N 13/31 |
| 2019/0278087 A1* | 9/2019 | Cheng | ............... | G02B 27/12 |

* cited by examiner

OPTICAL SYSTEM OF NEAR-EYE SEE-THROUGH HEAD-MOUNTED DISPLAY

BACKGROUND OF THE INVENTION

1. Field of the Invention

The invention provides an optical system of near-eye see-through head-mounted display, and more particularly, an optical system of near-eye see-through head-mounted display with an off-axis double reverse free-form surface with an ultra-large viewing angle.

2. Description of the Related Art

At present, virtual reality (VR) and augmented reality (AR) head-mounted displays are developing rapidly. For the purpose of enhancing immersion and obtaining a large viewing angle, the current VR head-mounted display products are large and heavy, so the user cannot walk around and interact with the outside world when wearing VR displays. In addition, AR head-mounted display products have a small viewing angle, and the AR head-mounted display products also have large volume and thick lenses. Because the viewing angle, exit pupil aperture, and focal length of the optical system are mutually restrictive, achieving a large viewing angle, large exit pupil aperture and short focal length simultaneously are quite difficult. The shortcomings in the prior art are listed as follows:

existing virtual reality and augmented reality head-mounted displays use multiple catadioptric prisms or lenses to achieve multi-channel display. At this time, the prisms or lenses used will have dispersion issues and the entrance pupil distance is not large, so it is not compatible with glasses. If it is designed to have a large entrance pupil distance, the volume and weight of the head-mounted display will increase exponentially, and multiple refractions and reflections reduce the utilization of light energy. At the same time, the double refraction of the external actual light by the wedge prism causes the user to observe the distortion of the external real world. The light source is generated using a micro liquid crystal display. The resolution of the micro liquid crystal display is difficult to be high, and the area and brightness is limited (because the temperature is considered), the cost is also very high. In addition, there are issues of two lenses asymmetry, material selection, injection molding shrinkage during manufacturing, thermal expansion, gluing, and large weight and volume of solid materials.

In a prior art, a prism with three free-form surfaces, and a micro image display, are used to form a virtual reality device and an augmented reality device. However, when the light emitted by the micro image display is imaged by the prism, it needs at least two refractions and two reflections before the light enters the user's eyes. Each refraction increases the risk of image distortion in the image emitted by the micro image display, and the refractive index of the prism with three free-form surfaces is not equal to 1, so in addition to the previous two refractions and two reflections, the light in the free-form prism, due to the fact that the material is unevenly distributed and the refractive index at each point is not equal to 1, will be tens of thousands of times of refractions and reflections on the image light, which seriously affects the imaging quality. In addition, prism with a free-form surface is generally made of glass, and this device is formed by splicing multiple prisms with free-form surfaces, which causes the entire device to be too heavy. Finally, since the cost and priding mirror technology are considered for the design of the prism with free-form surfaces, it is impossible to design the three optical free-form surfaces as free-form surfaces that can eliminate the image distortion, so that when the light encounters a free-form surface and is refracted, it will cause field curvature or spherical aberration and other aberrations, so the imaging quality of this device is poor. The improvement of image quality generally requires the use of a lot of correction technology, such as aberration correction or distortion correction etc., therefore, the manufacturing cost is increased.

SUMMARY OF THE INVENTION

In order to solve the above-mentioned technical problems, the present invention is to address the issue that the prism is inconvenient to use. According to the above-mentioned object, the invention provides an optical system of near-eye see-through head-mounted display, comprising a first lens, a second lens and a micro image display, wherein the first lens and the second lens are attached to the micro image display, and the first lens and the second lens are free-form lenses with a uniform thickness, so that an image generated by the micro image display is reflected and imaged in the first lens and the second lens. At the same time, a transflective characteristic can make a user see the real external environment through the first lens and the second lens.

According to the above-mentioned object, the invention provides an optical system of near-eye see-through head-mounted display, comprising a first lens, a second lens and a micro image display, wherein the first lens has a first surface and a second surface, the second lens has a third surface and a fourth surface, the first lens and the second lens are attached to the micro image display, and the first lens and the second lens are free-form lenses with a uniform thickness, and the second surface and the third surface are coated with a layer of transflective film, so that an image generated by the micro image display is reflected and imaged in the first lens and the second lens.

According to the above-mentioned object, the invention further provides a near-eye see-through head-mounted display, comprising a first lens group, a second lens group, and a micro image display, wherein after the first lens group and the second lens group are integrally formed, the first lens group and the second lens group are attached to the micro image display, wherein the first lens group and the second lens group have the same structure, wherein both the first lens group and the second lens group are made from a first lens and a second lens, the first lens and the second lens are free-form lenses with a uniform thickness, the first lens has a first surface and a second surface, the second lens has a third surface and a fourth surface, and the second surface and the third surface are coated with a layer of transflective film, so that an image generated by the micro image display is reflected and imaged in the first lens group and the second lens group.

An architecture of the optical system of near-eye see-through head display provided by the present invention can not only reduce the number of times light is refracted in this optical system architecture, but also reduce the occurrence of aberrations.

After the image generated by the micro image display of the present invention is reflected by the first lens and the second lens, a reflecting surface of the first lens enlarges the Y axis and X axis of the image, a reflecting surface of the second lens enlarges the Y axis of the image and reduces the X axis of the image. So it is easy to optimize the distortion of Y-axis off-axis, and optimize the lateral entrance pupil light angle and the fit of the face when it is X-axis (90-110 degrees) ultra-large viewing angle, to achieve an ultra-large viewing angle and an immersive experience.

In addition, the lens in the architecture of the optical system of near-eye see-through head-mounted display provided by the present invention is made of plastic, which can make the optical system of see-through head-mounted display be more compact, reduce the volume, and make the double glasses integrated by the manufacturing method. In addition, there is no seam between two eyes, in addition to resisting mechanical strain, it can also expand the field of view, and each pixel can also be integrally formed with each other without using stitching.

By setting the free-form surface in the lens, the aberrations of the light emitted by the micro image display in various directions can be eliminated, so that the image viewed from various directions and angles will not cause aberrations.

With the architecture of the optical system of near-eye see-through head-mounted display provided by the present invention, the image emitted by the miniature image display can be connected to the lens assembly without refraction, which reduces one refraction and therefore reduces the chance of image change.

In addition, the first lens and the second lens in the lens assembly are constructed by free-form surfaces with a uniform thickness, which can reduce the distance (or thickness) between the first lens and the second lens, can effectively shorten the optical path and thus reduce the issues of distortion and dispersion.

In addition, as the first lens and the second lens are free-form surfaces with a uniform thickness, the external image will not be inclined or deformed.

In addition, the transflective film provided by the present invention can totally reflect light, or can make light transflective, on a specific surface, so it is convenient.

By using a high-brightness display with a size of 2-3 inch, the invention can make the luminous brightness higher, can make the focal length longer, and can achieve the effect of ultra-large viewing angle.

Finally, when the transflective film of the present invention reflects the image generated by the micro image display, the image can produce the effect of enlarging the image on the Y axis and the X axis in the first lens; when its mirror curvature corresponds to a large viewing angle, there is a good reflection imaging angle. In the meantime, the X-axis direction of the second lens is concavely reduced, which can greatly adjust the aberration and field curvature in the X-axis when the viewing angle reaches 90-110 degrees, making the optical system of near-eye see-through head-mounted display of the present invention can achieve the ultra-large viewing angle.

BRIEF DESCRIPTION OF THE DRAWINGS

FIG. 1 (*a*) is a side view before the combination of a lens assembly and a micro image display according to the technology disclosed by the present invention, showing an optical system of near-eye see-through head-mounted display;

FIG. 1 (*b*) is a side view after the combination of a lens assembly and a micro image display according to the technology disclosed by the present invention, showing an optical system of near-eye see-through head-mounted display;

DETAILED DESCRIPTION

In order to make the purpose, technical features and advantages of the present invention more understandable to those skilled in the art and to implement the present invention, the technical features and embodiments of the present invention are specifically illustrated in accompany with the drawings, and the preferred embodiment is listed for further illustration. The drawings listed in the following are schematic representations related to the features of the present invention, and they are not needed to be completely drawn according to the actual situation. The description of the embodiment of the present invention involves technical issues that are well known to those skilled in the art, and will not be stated again.

Figure 1:
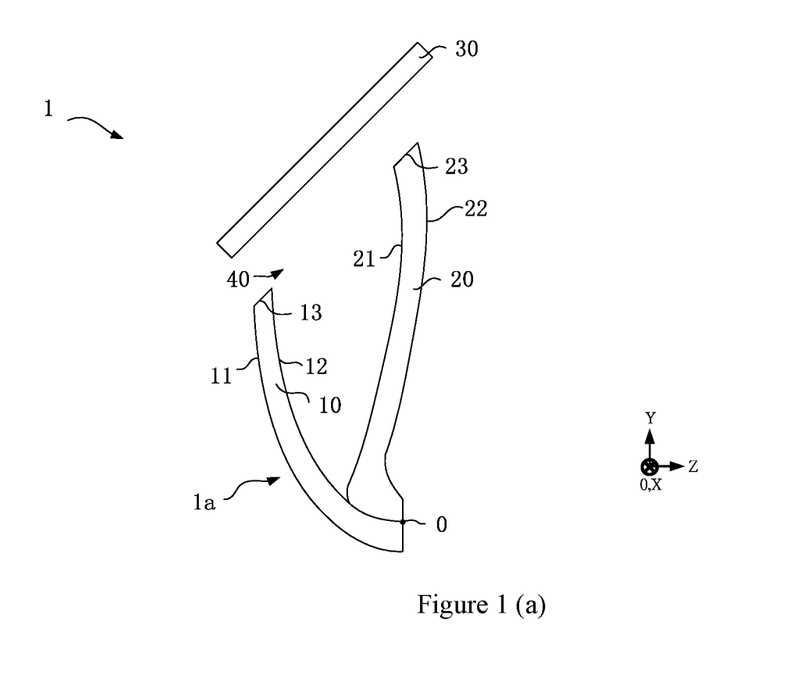

The coordinate system described in the description of the embodiments and the reference numbers of the drawings in the specification is a Cartesian coordinate system, that is, a three-axis (X, Y, Z) orthogonal coordinate system, and a right-handed coordinate system is used. The directions of the three axes are as indicated in each of the drawings of the specification. The direction of the coordinate axis is based on FIG. 1, and the other figures are views in different directions of FIG. 1. In the present invention, the axial direction of the X axis is referred to as a first direction, the axial direction of the Y axis is referred to as a second direction, and the axial direction of the Z axis is referred to as a third direction. A plane formed by the Y axis and the Z axis is called a first plane, a plane formed by the X axis and the Y axis is called a second plane, and a plane formed by the X axis and the Z axis is called a third plane. The origin of coordinate axis is located at the intersection of the first lens and the second lens, which is shown as the number 0 in the drawings of the specification.

First, as referred to FIG. 1(*a*), there is provided a side view of an optical system 1 of near-eye see-through head-mounted display of the present invention before the combination of a lens assembly and a micro image display. As shown in FIG. 1(*a*), the optical system 1 of near-eye see-through head-mounted display of the present invention comprises: a first lens 10, a second lens 20, and a micro image display 30. In terms of definition of optics, the first lens 10 and the second lens 20 are respectively two lenses, which are used as optical glasses, and after a proper combination of the two, a lens assembly 1*a* is formed. In addition, on the first plane (that is, the plane formed by the Y axis and the Z axis), the appearance of the lens assembly 1*a* formed by the first lens 10 and the second lens 20 is a harp-lacking neck. On the first plane the neck is an opening 40 of the lens assembly 1*a*. On one side of the opening 40, there are two opening ends, namely a first opening end 13 and a second opening end 23. The first opening end 13 is located at the open end of the first lens 10, and the second opening end 23 is located at the open end of the second lens 20.

Then, as referred to FIG. 1(a), the first lens 10 has a first surface 11 and a second surface 12, and the second lens 20 has a third surface 21 and a fourth surface 22. These four surfaces are so-called free-form surfaces. On the first plane, the projection line segments of the first surface 11 and the second surface 12 are parallel to each other, the projection line segments of the third surface 21 and the fourth surface 22 are also parallel to each other. This is to avoid aberrations when the light encounters the lens. Wherein, the first lens 10 and the second lens 20 can choose to use optical glass or polymer as a material. In a preferred embodiment of the present invention, the first lens 10 and the second lens 20 can use polymer engineering plastics as materials, such as: polymethyl methacrylate (i.e., acrylic, PMMA), or polycarbonate (PC), or polypropylene (PP), or polyethylene terephthalate (PET), or nylon (Nylon). The materials can also be the glass containing oxides of high-purity silicon, boron, sodium, potassium, zinc, lead, magnesium, calcium, and barium. When the first lens 10 and the second lens 20 select to use polymethyl methacrylate (i.e., acrylic, PMMA) or polycarbonate (PC) as the material, the first lens 10 and the second lens 20 are the lens assembly 1a which is integrally formed. For example: pour the hot liquid polymethyl methacrylate material into the mold through a pre-built mold. After standing for a period of time, the mold temperature drops to room temperature and the polymethyl methacrylate is sizing, then the solidified polymethyl methacrylate will be separated from the mold, thus a lens assembly 1a composed of the first lens 10 and the second lens 20 is formed. In addition, since the thickness of first lens 10 and the thickness of the second lens 20 are uniform, there is no shrinkage during injection molding and no complicated internal stress, which makes the manufacturing yield easy to improve and directly and indirectly reduces the manufacturing cost of the device. If the first lens 10 and the second lens 20 choose to use glass containing high-purity silicon, a glass plate of high-purity silicon with a height of 10 cm and a maximum surface area of 10000 $cm^2$ will be cut into small glasses with a height of 10 cm, a length of 10 cm, and a width of 5 cm, the small glasses are used for subsequent process of mirror grinding.

In an embodiment of the present invention, in order to avoid distortion or spherical aberration during imaging of the first lens 10 and the second lens 20, therefore in a preferred embodiment, the thickness of the curved surface of the first lens 10 and that of the second lens 20 are uniform. In an embodiment of the present invention, the thickness of the curved surfaces of the first lens 10 and that of the second lens 20 are both in a range of 1 to 3 mm, preferably are 2.5 mm.

As referred to FIG. 1(b), there is provided a side view of the optical system 1 of near-eye see-through head-mounted display of the present invention after the combination of the lens assembly and the micro image display. After the lens assembly 1a is formed, the micro image display 30 covers the first opening end 13 of the first lens 10 and the second opening end 23 of the second lens 20. After the two ends of the micro image display 30 are respectively bonded with the first opening end 13 and the second opening end 23 via industrial glue, the optical system 1 of near-eye see-through head-mounted display can be formed. When viewed from the first plane, the micro image display 30 is bridged between the first opening end 13 and the second opening end 23, resembling a bridge supported via the first opening end 13 and the second opening end 23. The micro image display 30 is used to provide an image (not shown) generated by itself, and the image is reflected by the first lens 10 and the second lens 20 into the retina of the user's eyeball for imaging, so that the user's eye can see the image. In particular, users can see this image appears in front of them (that is, the effect of virtual reality). In addition, the optical system 1 of near-eye see-through head-mounted display of the present invention allows the users to see the superimposed image of the image and an external image, especially using the structure with two free-form lenses with a uniform thickness, so that the external image will not be inclined or deformed. In other words, when the system is used in the field of augmented reality (AR), the image can be integrated with the outside real world scene.

The micro image display 30 may be formed by a liquid crystal screen (for example, LCD, OLED, AMOLED, or LED), an LCOS screen, or a CMOS screen. The area of the screen of the micro image display 30 may be in a range of 5 inches to 7 inches, preferably 1.5 inches to 3 inches, but the invention is not limited, as long as on the first plane the micro image display 30 looks capable of covering the opening formed by the first lens and the second lens. The micro image display 30 also has a preprocessing function, for example, the micro image display 30 is able to control the number of images to be generated, and to control the magnification of different pixels in the image through the software of the micro image display 30, so that the barrel distortion and trapezoidal distortion of the image seen by the retina in the user's eyes are eliminated. For these functions, the present invention is not limited.

In particular, the present invention uses the structure of the lens assembly 1a to achieve the virtual reality imaging function, while in the background technology, the prior art use the prism structure to achieve the virtual reality imaging function. The difference therebetween lies in that the projection of the prism structure in the background technology on the first plane is transflective, and is a trapezoid. But the projection of the lens assembly 1a of the present invention on the first plane is transflective, and is a V shape. In addition to saving the amount of material used, the lens assembly can also effectively reduce the overall weight of the optical system 1 of near-eye see-through head-mounted display (for example, reducing the weight in a range of 50-80%), thereby reducing the manufacturing cost of the overall system. In addition, as the discrepancy between the lens assembly structure and the prism structure, the optical paths therein are also different. For example, the image light emitted by micro image display 30 in the background technology needs to be refracted once to enter the prism structure, but in the structure of the lens assembly 1a of the present invention, the image light emitted by the micro image display 30 can be emitted to the lens assembly 1a without refraction, which reduces one time of refraction and therefore reduces the possibility of image distortion. In addition, the first lens 10 and the second lens 20 in the lens assembly 1a are constructed by a structure with uniform free-form surfaces, which can reduce the distance between the first lens 10 and the second lens 20, and reduce the thickness of the first lens 10 and the second lens 20. So the optical path can effectively be shortened, thereby addressing the issue of reducing distortion and dispersion. In addition, since the first lens 10 and the second lens 20 are all constructed by a structure with uniform free-form surfaces, the external image will not be inclined or deformed, which is not possible for the prism structure.

Next, the curved conditions of the first lens 10 and the second lens 20 of the optical system 1 of near-eye see-through head-mounted display of the present invention in the Cartesian coordinate system is described. As shown in FIG. 1(b), in the optical system 1 of the near-eye see-through head-mounted display, the curved surface conditions on the first surface 11 to the fourth surface 22 should satisfy the description of Formula (1):

$$z = \frac{cr^2}{1+\sqrt{1-(1+k)c^2r^2}} + \sum_{i=1}^{8} a_i r^{2i} + \sum_{i=1}^{N} A_i Z_i(\rho, \varphi) \quad (1)$$

wherein, $c=1/r_0$, $r_0$ is a radius of curvature of a reference surface of the free-form surface, k is a quadratic surface coefficient, r is the radial coordinate of the incident ray, $a_i$ is the higher-order coefficient, $Z_i(\rho, \varphi)$ is Zernike polynomials, N is the total number of Zernike polynomials, $A_i$ is a coefficient of the $i^{th}$ Zernike polynomial, $\rho$ is a normalized radius coordinate, and $\varphi$ is a normalized angle coordinate.

In the present invention, the two reflective curved surfaces formed by the Zernike Polynomials are used to control the focal power in the z direction. The two off-axis surfaces, the second surfaces 12 and the third surface 21, are mutually compensated to eliminate the image distortion and field curvature.

The above-mentioned parameters are subject to various optical path conditions to determine the actual value of each parameter. In actual operation, the actual values under various conditions in Formula (1) are determined by optical simulation software to form the exact shapes of the first surface to fourth surface, and then the first lens 10 and the second lens 20 are casted.

Figure 2:
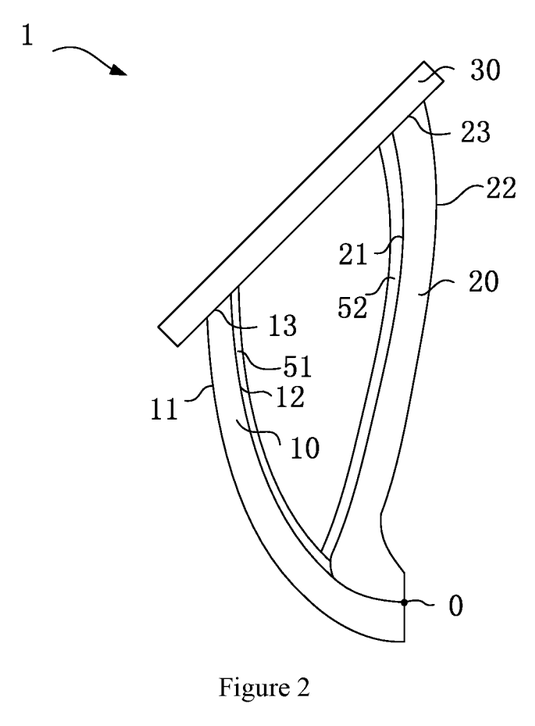
FIG. 2 is an architectural diagram of another embodiment according to the technology disclosed in the present invention, showing an optical system of near-eye see-through head-mounted display attached with a transflective film.

Next, as referred to FIG. 2, there is provided an architectural diagram of another embodiment in the present invention, showing an optical system of near-eye see-through head-mounted display attached with a transflective film. Wherein, both the second surface 12 and the third surface 21 can be coated with a layer of transflective film 51/52. The film on the second surface 12 is referred to as a transflective film 51, the film on the third surface 21 is referred to as a transflective film 52. The transflective film 51 and the transflective film 52 can increase the function of the first lens 10 and the second lens 20 to reflect light. That is, the transflective film 51/52 makes the first lens 10 and the second lens 20 have the function of mirror, so that the user's eyes can see through the optical system 1 of near-eye see-through head-mounted display of the present invention to feel that an external image composed of ambient light appears in front of the eyes.

In this embodiment, the transflective film 51/52 can be implemented by the following ways: 1. the transflective dielectric film layer, the reflectivity can be designed according to user's requirements, and the purpose of imaging and light transmission can be realized by the transflective light. 2. Transflective metal film and metal oxide film or synthetic film. 3. With respect to non-dielectric film with reflection and penetration effect, such as coating two films with different refractive index on the second surface 12 or the third surface 21, for example, high-refractive-index titanium dioxide (TiO2) and low-refractive-index silicon dioxide (SiO2), two kinds of films are alternately plated on the second surface 12, the number of layers of titanium dioxide film and dioxide silicon film is not limited. Generally, two layers are plated separately. The total thickness of the film layer can reach 137.5 nm to produce a reflection effect. The number of layers of film increases and the reflection effect increases. 4. Metals and metal oxides or a synthetic film layer with light reflection and transmission effects, such as an aluminum (Al) film in a range of 30 to 100 nm. 5. A metal alloy film layer with reflection and transparency effects, such as an aluminum neodymium alloy (AlNd) film in a range of 30 to 100 nm, etc.

In another embodiment of the present invention, the light transmissivity of the transflective film 51/52 (light transmissivity is the transmission ratio of the luminous flux of the material, that is, the ratio of the light intensity after the light transmits through the material and the light intensity of the original) is controlled in a range of 10% to 70%, and the reflectivity (the reflectance of the light flux of the material, that is, the ratio of the light intensity after the light is reflected by the material to the light intensity of the original) is controlled in a range of 10% to 70%, therefore, a good transflective effect can be achieved. Of course, controlling the transmissivity and reflectivity of the transflective film 51/52 beyond the above range can also achieve the objectives of the present invention, for example: a transmittance of 29% and a reflectance of 71% can also achieve the objectives of the invention. In addition, after the treatment of the two layers of transflective films 51/52 of the present invention, the image light emitted from the micro image display 30 can be reflected more than 20% of the brightness of the light to the user's eyes E, while the ambient light also emits more than 20% of the brightness of the light to the user's eyes E, so that the virtual scene and the real scene can reasonably and clearly superimpose on the user's eye E.

Figure 3:
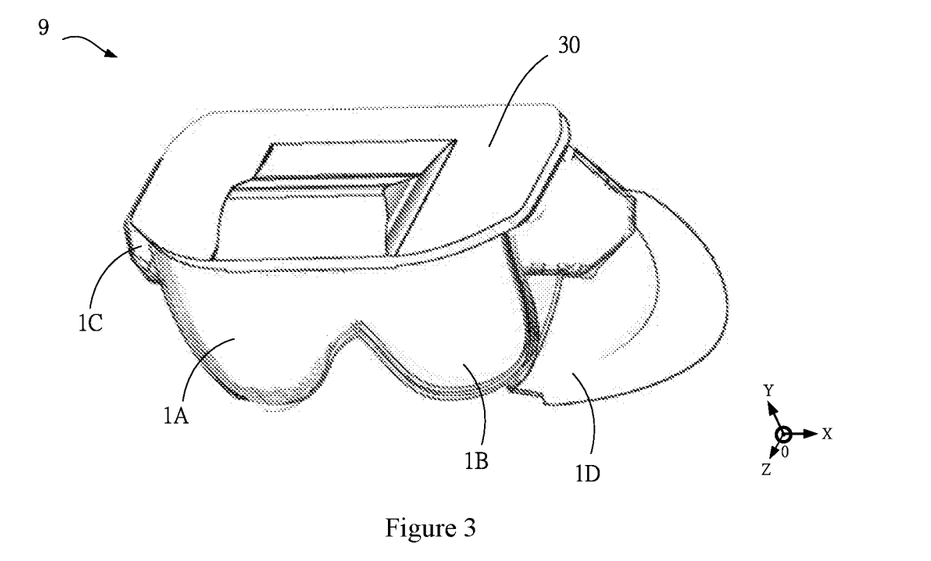
FIG. 3 is a diagram according to the technology disclosed in the present invention, showing a physical architecture of near-eye see-through head-mounted display.

Then, as referred to FIG. 3, there is provided a physical architecture diagram of the near-eye see-through head-mounted display of the present invention. As can be seen from FIG. 3, the near-eye see-through head-mounted display 9 physically includes two lens groups, namely a first lens group 1A and a second lens group 1B. A micro image display 30 covers and fits on the upper end of the first lens group 1A and the upper end of the second lens group 1B. The first lens group 1A and the second lens group 1B have the same structure, and each is composed of the first lens 10 and the second lens 20. The two lens groups are designed such that human binocular vision can be fully achieved. In an embodiment of the present invention, the first lens group 1A and the second lens group 1B are also formed integrally, for example, using a mold to integrally mold the first lens group 1A and the second lens group 1B, and the manufacturing process of the first lens group 1A and the second lens group 1B is as same as the manufacturing process illustrated in FIG. 1a, so the description will not be repeated here. The optical system 1 of near-eye see-through head-mounted display further comprises a left strap 1C and a right strap 1D for the user to wear. When worn, the positions of the first lens group 1A and the second lens group 1B are in the −Z direction relative to the user's eyes E, similar to wearing mirror glasses, so that the image seen by the user's eye E is in front of the eyes. In an embodiment of the present invention, the side view of the near-eye see-through head-mounted display 9 in X-direction is the optical system 1 of near-eye see-through head-mounted display shown in FIG. 1(b), except for the addition of the left strap 1C and the right strap 1D, which are convenient for users to wear.

In an embodiment of the present invention, the actual length of the see-through head-mounted display 9 is in a range of 130-150 mm, the height thereof is in a range of 32-38 mm, and the weight thereof is 80-170 g, so the display is light and compact. In the present invention, the reason why the first lens group 1A and the second lens group 1B are integrally formed without using the splicing method is that, the first lens 10 and the second lens 20 have a lighter weight, the bonding point is reduced to strengthen the mechanical strength, and the image is not blocked by the bonding point to increase the viewing angle. In addition, the micro image display 30 can be, in the form of an integrated circuit chip, bridged between the opening 40 of the first lens 10 and the second lens 20 respectively; or there is a large chip which is bridged between the opening 40 of the first lens 10 and the second lens 20 at the same time. In addition, the micro image display has a software that can adjust the content of the images emitted by the first lens 10 and the second lens 20, such as, magnification and brightness, so that the images seen by the user's eyes are more three-dimensional.

The ultra-large viewing angles provided by the virtual reality and augmented reality head-mounted displays in the prior art are generally in a range of 40-60 degrees, but the present invention uses a thin and large free-form surface and a special surface shape, as well as a control of reflection angle of transflective film 51, to not only compensate off-axis optics (optical path, spherical aberration, coma aberration, field curvature, distortion), but also cleverly make the surface shape fit with the face shape in case of the horizontal large viewing angle. The viewing angle can reach in a range of 90 degrees to 110 degrees, the viewing area is more than half or even double that of the past, but the weight is still light (as it is hollow). Compared with the prism made of solid glass in the prior art, the weight will be more than 4-5 times heavier than the present invention (more than one pound, the weight, plus other original glasses, will be close to 1 kg).

Figure 4:
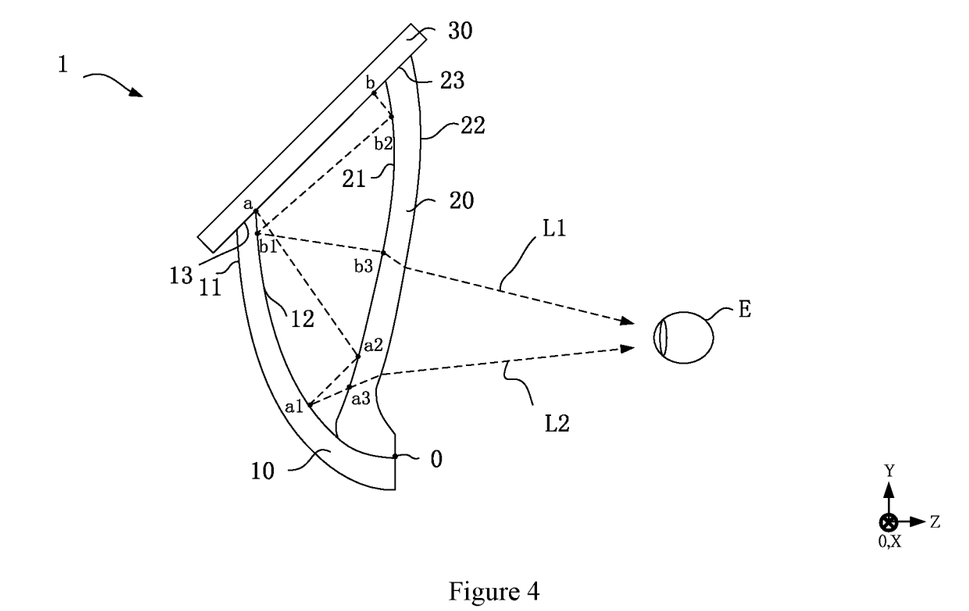
FIG. 4 is a light path diagram of an embodiment according to the technology disclosed in the present invention, showing a VR (Virtual Reality) of a optical system of near-eye see-through head-mounted display.

Next, as referred to FIG. 4, there is provided a light path diagram of an embodiment of a VR (Virtual Reality) of optical system 1 of near-eye see-through head-mounted display of the present invention. For ease of presentation, this optical path diagram is depicted using only the side view of the first lens 10 in the optical system of near-eye see-through head-mounted display. Further, the transflective film 51/52 on the second surfaces 12 and the third surface 21 are not shown in the figure, as the thickness (um) of the transflective film is different from the thickness (cm) of the first surface and the second surface by up to four levels (about $10^4$), so the effect of the thickness of the transflective film 51/52 on the optical path can be ignored. In order to simplify the complexity of the graphic marking, the transflective film is not marked in FIG. 4. In fact, if the first lens 10 and the second lens 20 are viewed from the +X axis toward the origin of the coordinate, the first lens 10 and the second lens 20 render coincident images due to the symmetry of the two lenses, as shown in FIG. 4. Also as shown in FIG. 4, there is provided the light path diagram of the first light L1 and the second light L2. To simplify the light in the figure, among the surface light source of the micro image display 30, we will use the edge light of the maximum field of view (first light) and the edge light of the minimum field of view (second light) to represent the optical behavior of the surface light source for the first lens 10 and the second lens 20 on the first plane. In addition, all lights in the image emitted by the micro image display 30 must have a path on the first plane between the first light L1 and the second light L2. In this embodiment, the actual optical path of the optical system 1 of near-eye see-through head-mounted display is after the first light L1 and the second L2 are emitted by the micro image display 30, the first light L1 and the second L2 come into the optical combination of the first lens 10 and the second lens 20, and are firstly reflected on the third surface 21, then are reflected on the second surface 12, after passing through the third surface 21 of the second lens 20 and transmitting through the fourth surface 22, finally, the first light and the second light can enter the eyes E of the user. At this time, both the second surface 12 and the third surface 21 are transflective surfaces. In order to achieve the above-mentioned light path, in the optical simulation, in addition to satisfying the Formula (1), the first light L1, the second light L2, the second surface 12 and the third surface 21 should also satisfy the Formula (2) to Formula (4) to confirm the final shapes of the second surface 12 and the third surface 21:

$$\begin{cases} 0.5 < Z_{a2} - Z_{a1} < 2 \\ Y_{a2} - Y_{a1} < 0 \\ Y_{a3} - Y_{a1} > 0 \end{cases} \quad (2)$$

$$\begin{cases} Y_a - Y_{b1} > 0 \\ -1.5 < Z_a - Z_{b1} < -0.2 \end{cases} \quad (3)$$

$$\begin{cases} 0 < Y_b - Y_{b2} < 2 \\ 0 < Z_b - Z_{b2} < 1 \end{cases} \quad (4)$$

Wherein, the algebras Y and Z in Formula (2) to Formula (4) respectively represent the coordinate values of a certain point in the Cartesian coordinate system of the present invention, and each subscript represents each different point, as shown in FIG. 4. L1 is the first light and L2 is the second light. Wherein, b is an emission point of the first light L1 emitted by the micro image display 30, b2 is an intersection of the first light L1 and the third surface 21 when the first light L1 is reflected, and b1 is an intersection of the first light L1 and the second surface 12 when the first light L1 is reflected; b3 is an intersection of the first light L1 and the second surface 12 when the first light L1 is refracted; a is an emission point where the micro image display 30 emits the second light L2, and a2 is an intersection of the second light L2 and the third surface 21 when the second light L2 is reflected, a1 is the intersection of the second light L2 and the second surface 12 when the second light L2 is reflected; a3 is the intersection of the second light L2 and the second surface 12 when the second light L2 is refracted.

In particular, the boundary conditions a and b of the starting point of the optical system 1 of near-eye see-through head-mounted display of the present invention are calculated directly from the light source (micro image display 30), while the boundary condition of the starting point of prior art in the background technology is calculated by the optical system (Prism). When the boundary condition of the starting point is calculated by the optical system (prism), there will be a displacement between the calculated optical path and the actual optical path. When the boundary conditions of the starting point are calculated by the light source, the calculated optical path is closer to the actual optical path, so that the possibility of imaging dispersion and distortion can be reduced. In addition, the first lens 10 and the second lens 20 of the optical system 1 of near-eye see-through head-mounted display of the present invention are transparent, so the user's eyes can directly see through the outside world, but they cannot do the same through the prism. As the prism will make the light bend, distort, disperse, and cause the curvature of field. Obviously, the first lens 10 and the second lens 20 used in the present invention are completely different from the prism structure in structure, optical path and imaging effect.

In addition, it should be particularly noted that another feature of the present invention is that the second surface 12 of the first lens 10 and the third surface 21 of the second lens 20 are coated with transflective film 51/52 respectively to serve as transflective surfaces. After that, when the transflective film 51/52 reflects the image light generated by the micro image display 30, the image is laterally reduced in the X axis of the second lens 20 to pre-correct aberration, and then the image generated by the first lens 10 is enlarged laterally in the X axis to an ultra-large viewing angle in a range of 90-110 degrees. With this design, when the first lens 10 is enlarged laterally in the X axis to an ultra-large viewing angle of 90-110 degrees, the serious aberrations and curvature of field will not be generated on the X axis. At the same time, on the Y axis the image is longitudinally off-axis enlarged by the Y axis of the second lens 20, and then the image is longitudinally off-axis enlarged by the Y axis of the first lens 10. With this design, serious off-axis aberrations are not generated. In addition, in the optical system 1 of near-eye see-through head-mounted display of the present invention, the intermediate image is not used, but a large focal length imaging is used. At the same time, the magnification used by the lens is not large (for example: around 7.5 times). Furthermore, in another preferred embodiment of the optical system 1 of near-eye see-through head-mounted display of the present invention, a larger display image source may be used. For example, the micro image display 30 may select a high-brightness display with a size in a range of 2-3 inches. The brightness of the light can be in a range of 800-2000 nit or higher, so display can have better heat dissipation, the display area can be larger and the viewing angle can be larger, so that the optical system 1 of near-eye see-through head-mounted display of the present invention can achieve effect of an ultra-large viewing angle.

Figure 5:
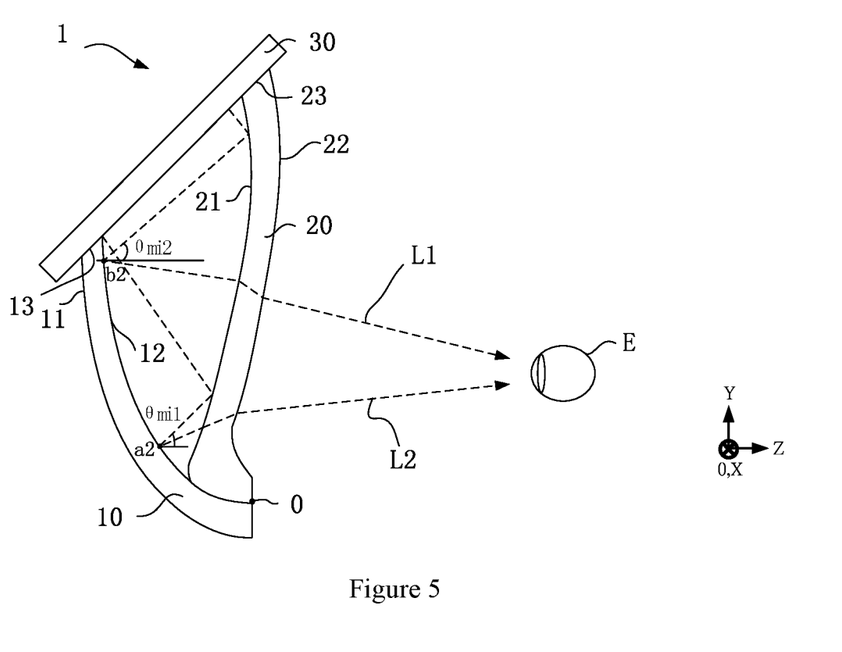
FIG. 5 is a light path diagram of an embodiment according to the technology disclosed in the present invention, showing a VR (Virtual Reality) of an optical system of near-eye see-through head-mounted display.

Finally, as referred to FIG. 5, there is provided a light path diagram of another embodiment of VR (Virtual Reality) of the present invention. In order to clearly show the position of the angle, FIG. 5 is formed by simplifying the optical path of FIG. 4 and marking the angle.

All the light emitted by the micro image display 30 will have an incident angle in relative to the second surface 12. The incident angle, such as $\theta_{mi1}$ and $\theta_{mi2}$ in FIG. 5, should be larger than a critical angle (listed by Formula (5)), thus a total reflection occurs on the second surface 12.

$$\begin{cases} \theta_{mi1} > \arcsin\left(\frac{1}{n'}\right) \\ \theta_{mi2} < \arcsin\left(\frac{1}{n'}\right) \end{cases} \quad (5)$$

Where n' represents the refractive index of the first lens 10 and the second lens 20.

The first lens 10 and the second lens 20 of the present invention are transparent optical materials with a refractive index greater than 1. On the one hand, they can be processed in batches by injection molding, on the other hand, they can effectively reduce the weight of the head-mounted display. In an embodiment of the present invention, if the refractive index of the material used, n is equal to 1.492, then the incidence angle of all image lights emitted by the micro image display 30 at the first reflection on the second surface 12 must be 42.2°, otherwise the lights will partly penetrate through the second surface 12 and cause the image seen by the user to be blurred. The light of the first light L1 and the second light L2 passing through the second surface 12 are the light that the user's eyes do not want to see, as it can generate partial reflected light on the first surface 11 and can be combined with other ambient light, then enter the user's eyes E and cause stray light, which interferes with the first light L1 and the second light L2, causing the image brightness seen by the user's eyes E to decrease and the image to be blurred. In an embodiment of the present invention, in order to control the total reflection of all image lights on the second surface 12, the incident angle of the first light L1 on the second surface 12 must be controlled to be greater than 42.2°, so that all image light emitted by the image display 30 can be totally reflected on the second surface 12.

In addition, in order to achieve total reflection of the image light generated by the micro image display 30 on the second surface 12, in addition to the above-mentioned means for controlling the critical angle, in another embodiment of the present invention, an appropriate transflective film 51/52 material is selected to form on the second surface 12 to achieve the condition of total reflection. In this embodiment, the second surface 12 is to allow the image light generated by the micro image display 30 to totally reflect, but the third surface 21 is to allow the image light generated by the micro image display 30 to be transflective. The materials of the transflective film 51/52 used in the second surface 12 and the third surface 21 are different. In this embodiment, the first lens 10 and the second lens 20 have the same direction of the first light L1 and the second light L2. At the same time, users can also adjust the light intensity of the micro image display via the software of the micro image display.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. An optical system of near-eye see-through head-mounted display, comprising a first lens, a second lens and a micro image display, wherein the first lens and the second lens are attached to the micro image display, and the first lens and the second lens are free-form lenses with a uniform thickness, so that an image generated by the micro image display is reflected and imaged in the first lens and the second lens.

2. The optical system of near-eye see-through head-mounted display of claim 1, wherein the first lens has a first surface and a second surface, the second lens has a third surface and a fourth surface, the first surface, the second surface, the third surface, and the fourth surface satisfy the following face shape equation (1):

$$z = \frac{cr^2}{1+\sqrt{1-(1+k)c^2 r^2}} + \sum_{i=1}^{8} a_i r^{2i} + \sum_{i=1}^{N} A_i Z_i(\rho, \varphi) \quad (1)$$

wherein, $c=1/r_0$, $r_0$ is a radius of curvature of a reference surface of the free-form surface, k is a quadratic surface coefficient, r is the radial coordinate of the incident ray, $a_i$, is the higher-order coefficient, $Z_i(\rho, \varphi)$ is Zernike polynomials, N is the total number of Zernike polynomials, $A_i$ is a coefficient of the $i^{th}$ Zernike polynomial, $\rho$ is a normalized radius coordinate, and $\varphi$ is a normalized angle coordinate.

3. The optical system of near-eye see-through head-mounted display of claim 2, wherein the second surface, the third surface, and the fourth surface should satisfy conditional equations (2) to (4):

$$\begin{cases} 0.5 < Z_{a2} - Z_{a1} < 2 \\ Y_{a2} - Y_{a1} < 0 \\ Y_{a3} - Y_{a1} > 0 \end{cases} \quad (2)$$

$$\begin{cases} Y_a - Y_{b1} > 0 \\ -1.5 < Z_a - Z_{b1} < -0.2 \end{cases} \quad (3)$$

$$\begin{cases} 0 < Y_b - Y_{b2} < 2 \\ 0 < Z_b - Z_{b2} < 1 \end{cases} \quad (4)$$

wherein, b is an emission point of the first light emitted by the micro image display, b2 is an intersection of the first light and the third surface when the first light is reflected, and b1 is an intersection of the first light and the second surface when the first light is reflected; b3 is an intersection of the first light and the second surface when the first light is refracted; a is an emission point where the micro image display emits the second light, and a2 is an intersection of the second light and the third surface when the second light is reflected, a1 is the intersection of the second light and the second surface when the second light is reflected; a3 is the intersection of the second light and the second surface when the second light is refracted.

4. The optical system of near-eye see-through head-mounted display of claim 1, wherein the material of the first lens and the second lens is optical glass, methyl methacrylate (PMMA), polycarbonate (PC), polypropylene (PP), polyethylene terephthalate (PET) or nylon (Nylon).

5. The optical system of near-eye see-through head-mounted display of claim 1, wherein the first lens and the second lens are integrally formed.

6. The optical system of near-eye see-through head-mounted display of claim 1, wherein a thick of the first lens and the second lens is in a range of 1-3 mm.

7. An optical system of near-eye see-through head-mounted display, comprising a first lens, a second lens and a micro image display, wherein the first lens has a first surface and a second surface, the second lens has a third surface and a fourth surface, the first lens and the second lens are attached to the micro image display, and the first lens and the second lens are free-form lenses with a uniform thickness, and the second surface and the third surface are coated with a layer of transflective film, so that an image generated by the micro image display is reflected and imaged in the first lens and the second lens.

8. The optical system of near-eye see-through head-mounted display of claim 7, wherein the first surface, the second surface, the third surface, and the fourth surface satisfy the following face shape equation (1):

$$z = \frac{cr^2}{1 + \sqrt{1 - (1+k)c^2 r^2}} + \sum_{i=1}^{8} a_i r^{2i} + \sum_{i=1}^{N} A_i Z_i(\rho, \varphi) \quad (1)$$

wherein, $c = 1/r_0$, $r_0$ is a radius of curvature of a reference surface of the free-form surface, k is a quadratic surface coefficient, r is the radial coordinate of the incident ray, $a_i$ is the higher-order coefficient, $Z_i(\rho, \varphi)$ is Zernike polynomials, N is the total number of Zernike polynomials, $A_i$ is a coefficient of the $i^{th}$ Zernike polynomial, $\rho$ is a normalized radius coordinate, and $\varphi$ is a normalized angle coordinate.

9. The optical system of near-eye see-through head-mounted display of claim 7, wherein the second surface, the third surface, and the fourth surface should satisfy conditional equations (2) to (4):

$$\begin{cases} 0.5 < Z_{a2} - Z_{a1} < 2 \\ Y_{a2} - Y_{a1} < 0 \\ Y_{a3} - Y_{a1} > 0 \end{cases} \quad (2)$$

$$\begin{cases} Y_a - Y_{b1} > 0 \\ -1.5 < Z_a - Z_{b1} < -0.2 \end{cases} \quad (3)$$

$$\begin{cases} 0 < Y_b - Y_{b2} < 2 \\ 0 < Z_b - Z_{b2} < 1 \end{cases} \quad (4)$$

wherein, b is an emission point of the first light emitted by the micro image display, b2 is an intersection of the first light and the third surface when the first light is reflected, and b1 is an intersection of the first light and the second surface when the first light is reflected; b3 is an intersection of the first light and the second surface when the first light is refracted; a is an emission point where the micro image display emits the second light, and a2 is an intersection of the second light and the third surface when the second light is reflected, a1 is the intersection of the second light and the second surface when the second light is reflected; a3 is the intersection of the second light and the second surface when the second light is refracted.

10. The optical system of near-eye see-through head-mounted display of claim 7, wherein the material of the first lens and the second lens is optical glass, methyl methacrylate (PMMA), polycarbonate (PC), polypropylene (PP), polyethylene terephthalate (PET) or nylon (Nylon).

11. The optical system of near-eye see-through head-mounted display of claim 7, wherein the first lens and the second lens are integrally formed.

12. The optical system of near-eye see-through head-mounted display of claim 7, wherein a thick of the first lens and the second lens is in a range of 1-3 mm.

13. The optical system of near-eye see-through head-mounted display of claim 7, wherein when the image generated by the micro image display is reflected by the first lens and the second lens, a reflecting surface of the first lens enlarges the Y axis and X axis of the image, a reflecting surface of the second lens enlarges the Y axis of the image and reduces the X axis of the image.

14. The optical system of near-eye see-through head-mounted display of claim 7, wherein a reflectivity of the layer of transflective film on the second surface is in a range of 20-70%, or a reflectivity of the layer of transflective film on the third surface is in a range of 20-70%.

15. A near-eye see-through head-mounted display, comprising a first lens group, a second lens group, and a micro image display, wherein after the first lens group and the second lens group are integrally formed, the first lens group and the second lens group are attached to the micro image display, wherein the first lens group and the second lens group have the same structure, wherein both the first lens group and the second lens group are made from a first lens and a second lens, the first lens and the second lens are free-form lenses with a uniform thickness, the first lens has a first surface and a second surface, the second lens has a third surface and a fourth surface, and the second surface and the third surface are coated with a layer of transflective film, so that an image generated by the micro image display is reflected and imaged in the first lens group and the second lens group.

16. The optical system of near-eye see-through head-mounted display of claim 15, wherein the first surface, the second surface, the third surface, and the fourth surface satisfy the following face shape equation (1):

$$z = \frac{cr^2}{1+\sqrt{1-(1+k)c^2r^2}} + \sum_{i=1}^{8} a_i r^{2i} + \sum_{i=1}^{N} A_i Z_i(\rho, \varphi) \quad (1)$$

wherein, $c=1/r_0$, $r_0$ is a radius of curvature of a reference surface of the free-form surface, k is a quadratic surface coefficient, r is the radial coordinate of the incident ray, $a_i$ is the higher-order coefficient, $Z_i(\rho, \varphi)$ is Zernike polynomials, N is the total number of Zernike polynomials, $A_i$ is a coefficient of the $i^{th}$ Zernike polynomial, $\rho$ is a normalized radius coordinate, and $\varphi$ is a normalized angle coordinate.

17. The optical system of near-eye see-through head-mounted display of claim 15, wherein the second surface, the third surface, and the fourth surface should satisfy conditional equations (2) to (4):

$$\begin{cases} 0.5 < Z_{a2} - Z_{a1} < 2 \\ Y_{a2} - Y_{a1} < 0 \\ Y_{a3} - Y_{a1} > 0 \end{cases} \quad (2)$$

$$\begin{cases} Y_a - Y_{b1} > 0 \\ -1.5 < Z_a - Z_{b1} < -0.2 \end{cases} \quad (3)$$

$$\begin{cases} 0 < Y_b - Y_{b2} < 2 \\ 0 < Z_b - Z_{b2} < 1 \end{cases} \quad (4)$$

wherein, b is an emission point of the first light emitted by the micro image display, b2 is an intersection of the first light and the third surface when the first light is reflected, and b1 is an intersection of the first light and the second surface when the first light is reflected; b3 is an intersection of the first light and the second surface when the first light is refracted; a is an emission point where the micro image display emits the second light, and a2 is an intersection of the second light and the third surface when the second light is reflected, a1 is the intersection of the second light and the second surface when the second light is reflected; a3 is the intersection of the second light and the second surface when the second light is refracted.

18. The optical system of near-eye see-through head-mounted display of claim 15, wherein the material of the first lens and the second lens is optical glass, methyl methacrylate (PMMA), polycarbonate (PC), polypropylene (PP), polyethylene terephthalate (PET) or nylon (Nylon).

19. The optical system of near-eye see-through head-mounted display of claim 15, wherein a thick of the first lens and the second lens is in a range of 1-3 mm.

20. The optical system of near-eye see-through head-mounted display of claim 15, wherein when the image generated by the micro image display is reflected by the first lens and the second lens, a reflecting surface of the first lens enlarges the Y axis and X axis of the image, a reflecting surface of the second lens enlarges the Y axis of the image and reduces the X axis of the image.

21. The optical system of near-eye see-through head-mounted display of claim 15, wherein a reflectivity of the layer of transflective film on the second surface is in a range of 20-70%, or a reflectivity of the layer of transflective film on the third surface is in a range of 20-70%.

* * * * *